(12) United States Patent
Gisslén et al.

(10) Patent No.: US 12,066,883 B2
(45) Date of Patent: Aug. 20, 2024

(54) GLITCH DETECTION SYSTEM

(71) Applicant: Electronic Arts Inc., Redwood City, CA (US)

(72) Inventors: Linus Mathias Gisslén, Stockholm (SE); Carlos García Ling, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/017,585

(22) Filed: Sep. 10, 2020

(65) Prior Publication Data

US 2021/0366183 A1 Nov. 25, 2021

Related U.S. Application Data

(60) Provisional application No. 63/027,051, filed on May 19, 2020.

(51) Int. Cl.
| | |
|---|---|
| *G06F 11/07* | (2006.01) |
| *A63F 13/525* | (2014.01) |
| *G06F 11/36* | (2006.01) |
| *G06F 18/24* | (2023.01) |
| *G06N 20/00* | (2019.01) |
| *G06T 7/00* | (2017.01) |

(Continued)

(52) U.S. Cl.
CPC ........ *G06F 11/0712* (2013.01); *A63F 13/525* (2014.09); *G06F 11/3664* (2013.01); *G06F 18/24765* (2023.01); *G06N 20/00* (2019.01); *G06T 7/0002* (2013.01); *G06T 15/506* (2013.01); *G06V 10/82* (2022.01); *G06V 10/98* (2022.01); *G06V 20/00* (2022.01); *G06T 2207/20081* (2013.01)

(58) Field of Classification Search
CPC ... G06T 15/506; G06T 7/0002; A63F 13/525; G06N 20/00; G06F 11/3664; G06K 9/626
USPC .......................................................... 345/419
See application file for complete search history.

(56) References Cited

U.S. PATENT DOCUMENTS

| 8,719,791 B1 | 5/2014 | MacPherson et al. |
| 8,997,061 B1 | 3/2015 | Davison |

(Continued)

OTHER PUBLICATIONS

Borovikov, et al., From Demonstrations and Knowledge Engineering to a DNN Agent in a Modern Open-World Video Game, Presentation Slides, 2019.

(Continued)

*Primary Examiner* — Hai Tao Sun
(74) *Attorney, Agent, or Firm* — Knobbe, Martens, Olson & Bear, LLP

(57) ABSTRACT

The present disclosure provides a system for automating graphical testing during video game development. The system can use Deep Convolutional Neural Networks (DCNNs) to create a model to detect graphical glitches in video games. The system can use an image, a video game frame, as input to be classified into one of defined number of classifications. The classifications can include a normal image and one of a plurality of different kinds of glitches. In some embodiments, the glitches can include corrupted textures, including low resolution textures and stretched textures, missing textures, and placeholder textures. The system can apply a confidence measure to the analysis to help reduce the number of false positives.

16 Claims, 12 Drawing Sheets

(51) Int. Cl.
*G06T 15/50* (2011.01)
*G06V 10/82* (2022.01)
*G06V 10/98* (2022.01)
*G06V 20/00* (2022.01)

(56) References Cited

U.S. PATENT DOCUMENTS

| | | | |
|---|---|---|---|
| 9,009,539 | B1 | 4/2015 | Kompotis et al. |
| 9,245,117 | B2 | 1/2016 | Weaver et al. |
| 9,898,391 | B1 | 2/2018 | Morice et al. |
| 10,282,280 | B1 | 5/2019 | Gouskova et al. |
| 10,286,323 | B2 | 5/2019 | Aghdaie et al. |
| 10,891,219 | B1 | 1/2021 | Dimitropoulos et al. |
| 10,940,393 | B2 | 3/2021 | Somers et al. |
| 10,949,325 | B1 | 3/2021 | Culibrk et al. |
| 11,179,644 | B2 | 11/2021 | Yen |
| 11,250,617 | B1* | 2/2022 | Sempe ............... G06F 3/012 |
| 11,446,570 | B2 | 9/2022 | Borovikov et al. |
| 2003/0005044 | A1 | 1/2003 | Miller et al. |
| 2003/0177187 | A1 | 9/2003 | Levine et al. |
| 2005/0138104 | A1 | 6/2005 | Houh et al. |
| 2005/0166115 | A1 | 7/2005 | Daume et al. |
| 2006/0253741 | A1 | 11/2006 | Garakani |
| 2007/0233497 | A1 | 10/2007 | Paek et al. |
| 2009/0027402 | A1 | 1/2009 | Bakalash et al. |
| 2009/0070746 | A1 | 3/2009 | Dhurjati et al. |
| 2009/0113251 | A1 | 4/2009 | Goossen et al. |
| 2009/0113303 | A1 | 4/2009 | Goossen et al. |
| 2010/0115496 | A1 | 5/2010 | Amichai |
| 2010/0144443 | A1 | 6/2010 | Graham |
| 2010/0144444 | A1 | 6/2010 | Graham |
| 2012/0204153 | A1 | 8/2012 | Peterson et al. |
| 2012/0209571 | A1 | 8/2012 | Peterson et al. |
| 2012/0311387 | A1 | 12/2012 | Santhosh et al. |
| 2013/0205286 | A1 | 8/2013 | Barraclough et al. |
| 2014/0085314 | A1* | 3/2014 | Steinke ............... G06T 13/00 345/473 |
| 2014/0300491 | A1 | 10/2014 | Chen |
| 2015/0375101 | A1 | 12/2015 | George |
| 2015/0375102 | A1 | 12/2015 | George |
| 2015/0375103 | A1 | 12/2015 | George |
| 2016/0041894 | A1 | 2/2016 | Reid, III et al. |
| 2016/0179659 | A1 | 6/2016 | Champlin-Scharff et al. |
| 2016/0262680 | A1 | 9/2016 | Martucci et al. |
| 2016/0283353 | A1 | 9/2016 | Owen et al. |
| 2016/0292065 | A1 | 10/2016 | Thangamani et al. |
| 2017/0123961 | A1 | 5/2017 | Cerny et al. |
| 2017/0147470 | A1 | 5/2017 | Bloching et al. |
| 2017/0201779 | A1 | 7/2017 | Publicover et al. |
| 2017/0230417 | A1 | 8/2017 | Amar et al. |
| 2017/0233497 | A1 | 8/2017 | Labrijn et al. |
| 2017/0242780 | A1 | 8/2017 | Arbel |
| 2017/0259177 | A1 | 9/2017 | Aghdaie et al. |
| 2017/0322917 | A1 | 11/2017 | Goyal et al. |
| 2017/0339037 | A1 | 11/2017 | Cheh et al. |
| 2018/0050273 | A1* | 2/2018 | Garoufalis ........ G07F 17/3286 |
| 2018/0165723 | A1 | 6/2018 | Wright et al. |
| 2018/0275989 | A1 | 9/2018 | Kakkad et al. |
| 2018/0293158 | A1 | 10/2018 | Baughman et al. |
| 2020/0089594 | A1 | 3/2020 | Zhou et al. |
| 2020/0159644 | A1* | 5/2020 | Beltran ............... A63F 13/23 |
| 2020/0334228 | A1* | 10/2020 | Matyska ............... G06N 20/00 |
| 2021/0346798 | A1 | 11/2021 | Borovikov et al. |
| 2022/0152516 | A1 | 5/2022 | Yen |
| 2022/0305386 | A1 | 9/2022 | Gisslen et al. |
| 2023/0009378 | A1 | 1/2023 | Borovikov et al. |

OTHER PUBLICATIONS

Borovikov, et al., From Demonstrations and Knowledge Engineering to a DNN Agent in a Modern Open-World Video Game, Published Apr. 26, 2019.

Borovikov, et al., Imitation Learning via Bootstrapped Demonstrations in an Open-World Video Game, Dec. 2018.

Borovikov, et al., Towards a Representative Metric of Behavior Style in Imitation and Reinforcement Learning, 23rd Annual Signal and Image Sciences Workshop at Lawrence Livermore National Laboratory (LLNL), Center for Advanced Signal Image Sciences (CASIS). May 15, 2019.

Borovikov, et al., Towards Interactive Training of Non-Player Characters in Video Games, Jun. 3, 2019.

Borovikov, et al., Towards Interactive Training of Non-Player Characters in Video Games, Presentation Slides, Jun. 14, 2019.

Zalavadia, How to use predictive analytics to optimize software delivery, Mar. 21, 2017.

Zhao, et al., Winning Isn't Everything: Enhancing Game Development with Intelligent Agents, Aug. 20, 2019.

\* cited by examiner

GLITCH DETECTION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entireties in accordance with 37 CFR 1.57 and made a part of this specification.

BACKGROUND

Video game applications can have complex virtual environments that are constantly changing during the development process and updated after release. The game environments can have thousands of components and features that can be difficult to debug. Game developers can use bug reports obtained from play testers and other systems to detect and diagnose gameplay issues or bugs within a game application. This can be a very time consuming and costly process that may only identify some of the glitches within the game application prior to release or after an update.

SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method comprising: executing a game application in a test mode; receiving a path for a virtual camera within a virtual environment, wherein the virtual environment is rendered within the test mode by a game engine, wherein the virtual camera follows the path within the virtual environment; during runtime of the test mode, acquiring frames rendered by the game engine, wherein the frames are rendered based on a viewpoint of the virtual camera within the virtual environment, wherein the virtual environment includes a plurality of virtual objects; analyzing the frames using a machine learning model, wherein the analysis of the machine learning model comprises: for individual virtual objects of the plurality of virtual objects, identifying a virtual object in a plurality of frames; determining a classification of the virtual object based on an analysis of a rendered appearance of the virtual object captured within the plurality of frames, wherein the classification identifies a graphical glitch of the virtual object; and outputting the classification of the virtual object.

Various embodiments of the system may include one, all, or any combination of the following features. In some embodiments, the method includes determining a confidence score associated with the classification of the virtual object. In some embodiments, the method includes determining whether the confidence score satisfies a confidence threshold associated with the classification. In some embodiments, if the confidence score does not satisfy the confidence threshold, the method further comprises adjusting the path of the virtual camera to acquire additional frames including the virtual object, and determining a classification based on an analysis included the additional frames. In some embodiments, if the confidence score does not satisfy the confidence threshold, the method further comprises adjusting rendering parameters of the virtual environment and acquiring additional frames including the virtual object, and determining a classification based on an analysis included the additional frames. In some embodiments, adjusting the rendering parameters includes changing lighting conditions of the virtual environment. In some embodiments, the path through the virtual environment is programmatically defined. In some embodiments, the virtual environment is a three dimensional virtual environment. In some embodiments, the classifications of graphical glitches include corrupted textures, stretched textures, low resolution textures, missing textures, and placeholder textures. In some embodiments, the method includes generating a bug report based on the identified graphical glitches in the virtual environment. In some embodiments, the method includes identifying a frame including the virtual object classified as a graphical glitch and a timestamp of the frame. In some embodiments, the method includes identifying a portion of the frame including the virtual object.

Another embodiment disclose a system comprising a data store storing a machine learning model; and at least one hardware processor configured with computer executable instructions that configure the at least one hardware processor to: execute a game application in a test mode; receive a path for a virtual camera within a virtual environment, wherein the virtual environment is rendered within the test mode by a game engine, wherein the virtual camera follows the path within the virtual environment, wherein the virtual environment includes a plurality of virtual objects; acquire frames rendered by the game engine, wherein the frames are rendered based on a viewpoint of the virtual camera within the virtual environment; analyze the frames using a machine learning model, wherein the analysis of the machine learning model comprises: for individual virtual objects of the plurality of virtual objects, identify a virtual object in a plurality of frames; determine a classification of the virtual object based on an analysis of a rendered appearance of the virtual object captured within the plurality of frames, wherein the classification identifies a graphical glitch of the virtual object; and output the classification of the virtual object.

In some embodiments, the computer executable instructions further configure the at least one hardware processor to determine a confidence score associated with the classification of the virtual object. In some embodiments, the computer executable instructions further configure the at least one hardware processor to determine whether the confidence score satisfies a confidence threshold associated with the classification. In some embodiments, if the confidence score does not satisfy the confidence threshold, the computer executable instructions further configure the at least one hardware processor to adjust the path of the virtual camera to acquire additional frames including the virtual object, and determine a classification based on an analysis included the additional frames. In some embodiments, if the confidence score does not satisfy the confidence threshold, the computer executable instructions further configure the at least one hardware processor to adjust the path of the virtual camera to adjust rendering parameters of the virtual environment to acquire additional frames including the virtual object, and determine a classification based on an analysis included the additional frames. In some embodiments, the adjustment of the rendering parameters includes changing lighting conditions of the virtual environment. In some embodiments, the classifications of graphical glitches include corrupted textures, stretched textures, low resolution textures, missing textures, and placeholder textures. In some embodiments, the computer executable instructions further configure the at least one hardware processor to: generate a bug report based on the identified graphical glitches in the virtual environment; identify a frame including the virtual object classified as a graphical glitch and a timestamp of the frame; and identify a portion of the frame including the virtual object.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

The present disclosure provides a system for automating graphical testing during video game development. The system can use Deep Convolutional Neural Networks (DCNN) to create a model to detect graphical glitches in video games. The system can use an image, a video game frame, as input to be classified into one of defined number of classifications. The classifications can include a normal image and one of a plurality of different kinds of graphical glitches. In some embodiments, the system can be trained to recognize various types of graphical glitches, some examples include corrupted textures, including low resolution textures and stretched textures, missing textures, and placeholder textures. The system can be trained to recognize any number and/or type of graphical glitches. The system can apply a confidence measure to the analysis to help reduce the number of false positives.

The system can provide significant improvements to graphical glitch detection processes. The system can provide a more robust analysis of virtual environments within a game application. The system can analyze more portions of virtual environments in less time than when performing manual testing. Additionally, the processes can accurately increase the number of graphical glitches detected and also improve glitch classification, while maintaining a low false positivity rate.

Overview of Video Game Environment

Figure 1:
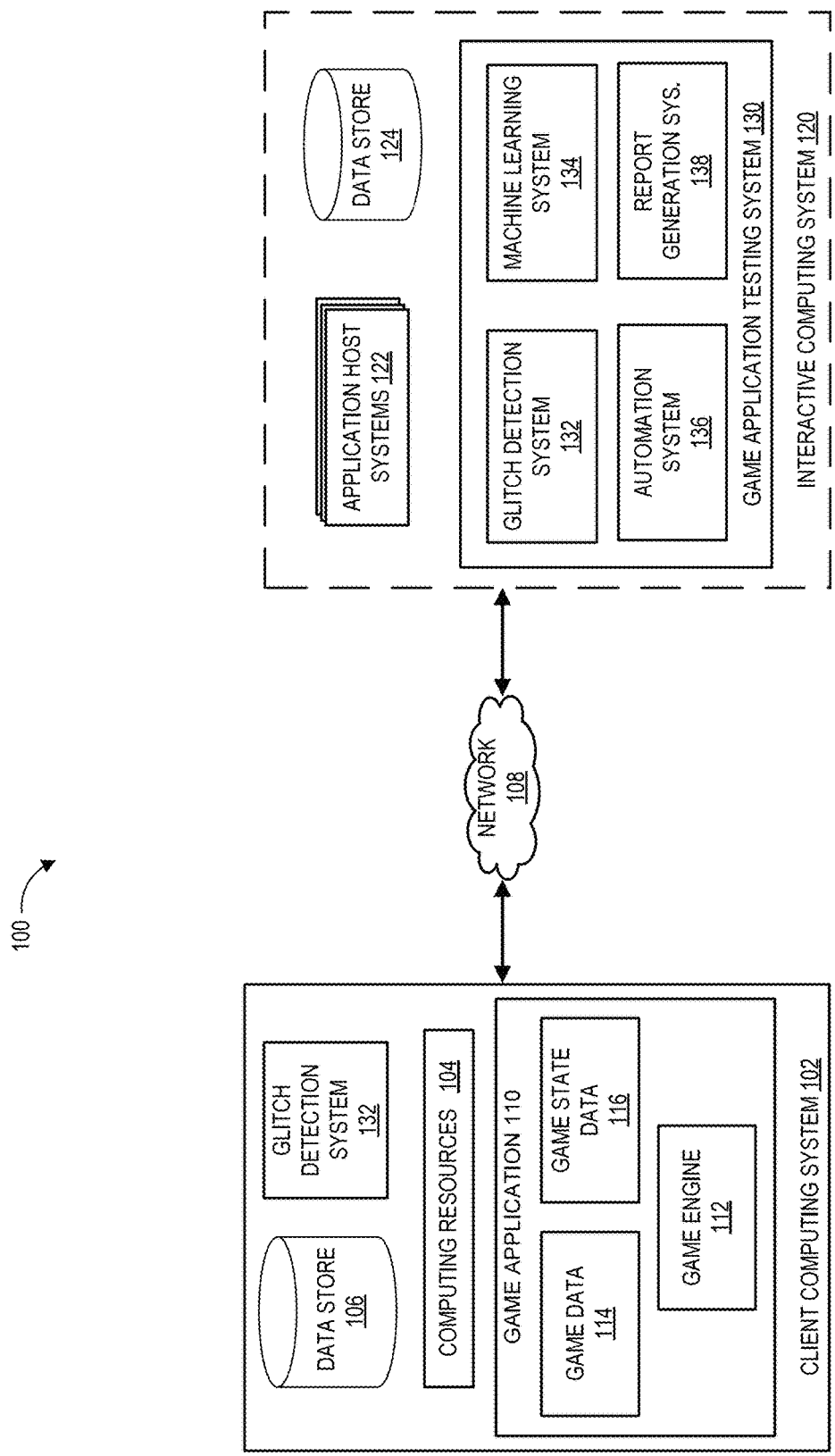
FIG. 1 illustrates an embodiment of a networked computing environment that can implement one or more embodiments of a glitch detection system.

FIG. 1 illustrates an embodiment of a computing environment 100 for implementing a glitch detection system. The environment 100 includes a network 108, a computing system 102, an interactive computing system 120, which includes application host systems 122, a data store 124, and a game application testing system 130, which can include a glitch detection system 132, a model generation system 134, a coordination system 136, and a data aggregation system 138. To simplify discussion and not to limit the present disclosure, FIG. 1 illustrates only one computing system 102 and one interactive computing system 10, though multiple systems may be used.

The client computing system 102 may communicate via a network 108 with the interactive computing system 120. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Client Computing System

The client computing system 102 includes computing resources 104 and a data store 106. The client computing system 102 may have varied local computing resources 104 such as central processing units and architectures, memory, mass storage, graphics processing units, communication network availability and bandwidth, and so forth. Further, the client computing system 102 may include any type of computing system, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 9.

Game Application

The client computing system 102 can include a game application 110 installed thereon. The client computing system 102 can execute the game application 110 based on software code stored at least in part in the application data store 106. The game application 110 may also be referred to herein as a video game, a game, game code or a game program. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, presentation, rendering, animation, and other game data. In the illustrated embodiment, the game application 110 includes a game engine 112, game data 114, and game state data 116. When executed, the game application 110 is configured to generate a virtual environment for a user to interface with the game application 110.

The game application 110 may be stored or executed in a distributed environment using a client/server architecture. For example, the client computing system 102 may execute a portion of a game application 110 and a server (such as an application host system 122) may execute another portion of the game application 110. For instance, the game application 110 may be a competitive multiplayer online game, such as a battle royale type game, that includes a client portion executed by the client computing system 102 and a server portion executed by one or more application host systems 122. For the present discussion, the game application 110 can execute locally on the client computing system 102 or can execute as a distributed application that includes a portion that executes on the client computing system 102 and a portion that executes on at least one or more application host systems 122.

Game Engine

During operation, the game engine 112 executes the game logic, controls execution of the simulation of gameplay, and controls rendering within the game application 110. In some cases, the game engine 112 controls virtual characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the virtual characters or the virtual environment.

In some embodiments, the game engine 112 can control simulation and presentation of a game application. Simulation of the game application can generally refer to execution of game logic and control of gameplay simulation. Presentation of the game application can generally refer to execution of presentation of the gameplay and rendering of frames. Aspects of the game engine that control simulation will generally be described as being controlled by a simulation engine and aspects of the game engine that control presentation will generally be described as being controlled by a presentation engine. In some embodiments, the game engine 112 can execute the functionality of simulation and presentation using different engines and/or processes within the game application.

The simulation engine can control execution of individual virtual components, virtual effects or virtual objects within the game application 110. The simulation engine can manage and determine character movement, character states, collision detection, derive desired motions for characters based on collisions, or the like. Input device(s) allow for user input to be received from the user in order to control aspects of the game application according to rule sets. The simulation engine receives the user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states.

The simulation engine can output graphical state data (e.g., game state data 116) that can be used by the presentation engine to generate and render frames within the game application 110. Graphical state data can be generated for each virtual object that can be used by the presentation engine in the rendering process. The graphical state data can include emitters, lights, models, occluders, terrain, visual environments, and other virtual objects within the virtual environment that can affect the state of the game.

The presentation engine can use the graphical state data to generate and render frames for output to a display within the game application 110. The presentation engine can combine the virtual objects, such as virtual characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (for example, lighting within the virtual environment and virtual character images with inanimate and background objects) to generate and render a frame. During runtime, the game engine can output many frames per second (e.g., 30 FPS, 60 FPS, or any other number of frames per second as determined during execution of the game application).

Game Data

The game data 114 can include rule sets, prerecorded motion capture poses/paths, environmental settings, environmental objects, constraints, skeleton models, route information, or other game application information.

Rule sets can be applied by the game engine 112 to control virtual characters, the virtual environment, execution of the gameplay, how the game progresses, or other aspects of gameplay. The rule sets can define the specific way in which virtual characters (for example, player characters or non-player characters) or the virtual environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway attack, defense, or the like. In some cases, rule sets can function as artificial intelligence for computer controlled virtual entities.

The rule sets can be described using the concepts of characters, actions, runtime states, and environments. The virtual character in the video game can be a player controlled character, which is controlled by a user, or a non-player character, which is controlled by the game application, and an action can be a move from a set of all possible moves the character can make. For example, in a hockey game, the character can pass (action A) or shoot (action B) the puck, among other possible actions. A runtime state can be described as a concrete and immediate situation in which the character finds itself. For example, the runtime state can be a specific place and moment, such as an instantaneous configuration that puts the character in relation to other significant things like tools, obstacles, enemies or prizes. A virtual environment can be described as the virtual world through which the character interacts with the game application. In general, a rule or rule set can define a character's way of behaving (for example, the character's actions) at a given time, runtime state, and environment.

At least a portion of the game data 114 can be stored in the application data store 106. In some embodiments, a portion of the game data 114 may be received or stored remotely, such as in the data store 124. Game data may be received during runtime of the game application 110. For example, in some cases, one or more rule sets can be received, stored, or applied during runtime of the game application 110.

Game State Information

During runtime of the game application 110, the game application 110 can collect or store game state data 118, which can include a game state, character states, environment states, scene object storage, or information associated with a runtime state of the game application 110. For example, the game state data 118 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Virtual Environment

As used herein, a virtual environment may include a simulated environment (for example, a virtual space) instanced on a client computing system 102 and/or a server that is accessible by a client (for example, client computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, client computing system s 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game to the users on the client computing system s 102. The game state data 118 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from client computing system s 102. In some embodiments, users may interact with elements in the video game or with each other through the video game.

Users may participate in the video game through client game applications 110 implemented on client computing system s 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through client computing system s 102. The given user may interact with other users through communications exchanged within the virtual environment. Such communications may include one or more of textual chat, instant messages, private messages, voice communications, or other communications. Communications may be received and entered by the users via their respective client computing system s 102. Communications may be routed to and from the appropriate users through server(s).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 120 can include one or more application host systems 122, and account data store 124, and a game application testing system 130. The interactive computing system 120 may include one or more computing systems configured to execute a portion of the game application 110. In some embodiments, the one or more application host systems 122 can include one or more computing devices, such as servers and databases that may host and/or execute a portion of one or more instances of the game application 110. In certain embodiments, instead of or in addition to executing a portion of the game application 110, the application host systems 122 may execute another application, which may complement and/or interact with the application 110 during execution of an instance of the application 110. The interactive computing system 120 can include one or more data stores 124 that are configured to store information associated with game applications hosted by the interactive computing system 120 and/or the application host systems 122.

Application Host System

The interactive computing system 120 may enable multiple users or computing systems to access a portion of the game application 110 executed or hosted by the interactive computing system 120. In some embodiments, the portion of the game application 110 executed by application host systems 122 of the interactive computing system 120 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 120. A set of users may be assigned to or may access one instance of the persistent virtual world while another set of users may be assigned to or may access another instance of the persistent virtual world. In some embodiments, the host application system 122 may execute a hosting system for executing various aspects of a game environment. For example, in one embodiment, the game application 110 may be a competitive game, such as a first person shooter or sports game, and the host application system 122 can provide a dedicated hosting service for hosting multiplayer game instances or facilitate the creation of game instances hosted by client computing devices. In some embodiments, the host application system 122 can provide a lobby or other environment for users to virtually interact with one another. Such environments may include environments for conducting transactions between players, such as an auction house or other type of environment for facilitating transactions.

Game Application Testing System

In some embodiments, the game application system 130 can be utilized to fully automate or partially automate the game application testing process. The game application testing system 130 can communicate with other systems to provide and automate the system for acquiring data associated with a game application and analyzing the data. The game application testing system 130 can include one or more systems for data acquisition and analysis. For example, the game application testing system 130 can include a glitch detection system 132, a model generation system 134, a game automation system 136, and a data aggregation system 138. These example systems are not intended to be limiting, and the game application testing system 130 may include fewer or more systems than described. In some embodiments, the game application testing system 130 may include more systems and/or functionalities that facilitate the acquisition of game data and the analysis of a game application.

The game application testing system 130 and its various systems may be distributed across multiple computing systems. The various systems of the game application testing system 130 can communicate with each other to obtain and analyze data associated with a game application. For example, a game console may acquire glitch data and communicate the acquired glitch data to the glitch detection system 132. The system can be configured to test glitches that occur on different platforms and/or hardware configurations. For example, different types of consoles, different drivers, hardware (e.g., graphics processing units), operating systems, and the like. Each system of the game application testing system 130 is described in more detail below.

Glitch Detection System

The glitch detection system can provide an automated system for identifying graphical glitches during development of a game application. The glitch detection system can be used during development of a game application, such as after new builds or updates to the game code. The glitch detection system can use a machine learning model to identify defined type of glitches within the virtual environment. The glitch detection system can control movement and orientation of a camera within the virtual environment and captures frames rendered by the game engine. The glitch detection system can analyze the rendered frames during runtime. The glitch detection system can determine whether a graphical glitch is present within the frames and provide a classification for the graphical glitch. The glitch detection system can identify the frames and/or specific virtual objects or entities that have graphical glitches. The glitch detection system can be integrated into the game engine during rendering of the virtual environment. The glitch detection system can access virtual object data and telemetry data associated with the virtual environment.

The glitch detection system can be configured to interface with the game engine to control aspects of rendering virtual environment. The glitch detection system can modify parameters of the virtual environment to better assess whether a graphical glitch is present. For example, the glitch detection system may modify lighting parameters within the virtual environment to better assess the graphical data of a virtual object. The glitch detection system can follow a defined movement path within the virtual environment. The path may be predefined by a user or programmatically generated based on test parameters.

In some embodiments, the glitch detection system can assign a confidence score to a glitch to help reduce false positives. The glitch detection system may acquire additional data related to a virtual object when the confidence score is below a confidence threshold. For example, the glitch detection system may deviate from the defined path to acquire additional images of a virtual object in order to better analyze the asset.

In some embodiments, the glitch detection system can analyze a portion of the virtual environment in parallel with other client computing systems. The glitch detection system can analyze the virtual environment and generate automated error reports without requiring a user to monitor the capture and analysis process.

Game Automation System

The game automation system 136 can be configured to coordinate acquisition and analysis of glitch detection data for a game application. The game automation system 136 can be a system configured to automate execution of multiple data acquisition sessions occurring in parallel. In some embodiments, the game automation system 136 can execute within the video game application 110 by interfacing with the API of the video game application 110. The game automation system can coordinate the different sessions that are be executed by different computing system in order to capture graphical data for the virtual environments within the game application.

Machine Learning System

Figure 2:
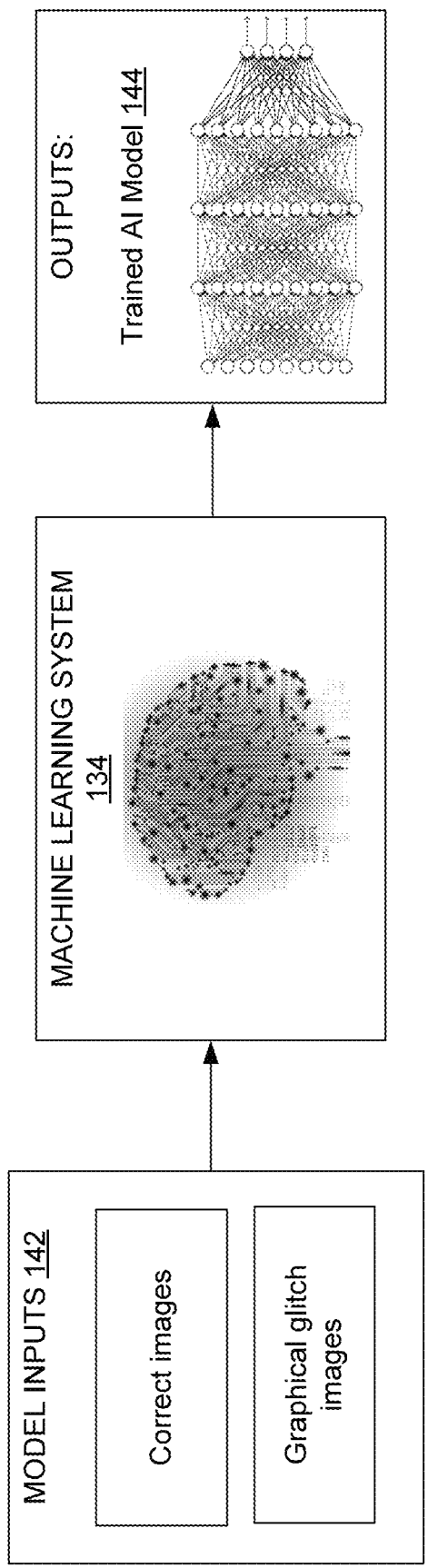
FIG. 2 presents a block diagram illustrating a machine learning model generation process.

The machine learning system will be further described with additional reference to FIG. 2, which illustrates an example block diagram 200 for generating a trained model 144. A plurality of model inputs 142 are provided to a machine learning system 134. The machine learning system 134 uses the model inputs 142 to generate the trained model 144.

Figure 3:
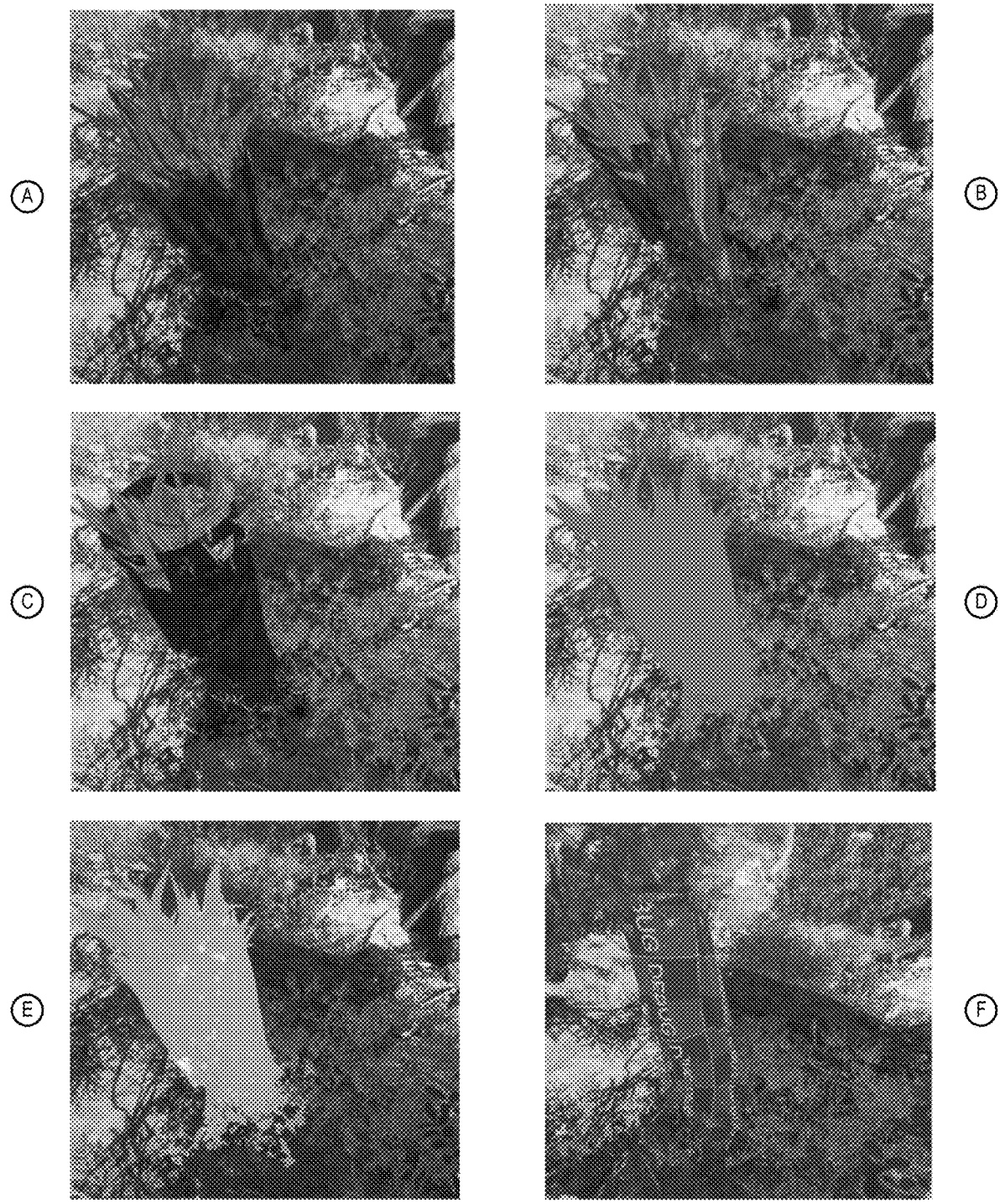
FIG. 3 illustrates embodiments various types of graphical glitches.

The machine learning system 134 can be used to train machine learning models based on the graphical data for a game application. As further shown in FIG. 2, model inputs are provided to the machine learning system 134. The model inputs 142 can include, for example, rendered texture images of virtual objects in the virtual environment indicated different kinds of graphical glitches, such as corrupted and missing textures. The image can be synthetically generated for the purpose of training the model. The images can be frames generated by the game engine during runtime. The input data can be synthetic training data that is generated for the purpose of training a machine learning model. The game engine can generate the type and amount of graphical test data that is requested for use during training the model. The training data may include images of specific game objects, such as trees, cars characters, or other digital assets that are created for the virtual environment. The training images may be of the game objects outside or within the virtual environment. The engine can keep generating test data for the specific types of glitches that need to be detected. Examples of graphical glitch test data are illustrated in FIG. 3. The examples are representative of common graphical glitches that occur when developing video games. The examples of graphical glitches are rendered texture glitches. A texture is the digital representation of the surface of an object in 3D graphics which is a fundamental part when rendering a video game scene. They define what the assets in a video game look like and when missing or incorrectly processed, they can impact the player's video game experience negatively. Other graphical glitches that may occur can also be generated for the purposes of training. For example, other graphical glitches may include clipping, where a texture extends through another 3D model and texture.

The machine learning models generated by the machine learning system 134 can be stored in a data store 124. The data store 124 can store a plurality of machine learning models that can be executed under different circumstances. The models can be trained for specific game applications. For example, different types of games can have different graphical properties that require the use of different models. For example, a game with realistic looking virtual environments and characters can use a different model than games that have a cartoon like graphical style. Even within a game application, multiple models can be generated based on types of virtual environments within the game. For example, different biomes (e.g., space, jungle, water, etc.) within a game can dictate the training and use of different models.

The generated models can be configured to automatically detect graphical glitches during runtime of the game application. The models can be applied a virtual camera moves through the virtual environment on a camera path during a glitch detection session. The machine learning system can use a deep convolutional neural network configured to use convolution analysis to analyze the images. The machine learning systems can be used to generate and update the models using supervised and non-supervised machine learning algorithms. Machine learning systems can be implemented using libraries such as ResNet, VGG, Alexnet, and ShuffleNetV2.

In one implementation, the machine learning model was generated in Pytorch, based on the implemented models in the Torchvision library. The models were modified to adjust to the number of classes. In order to fit the model to the data an Adam optimizer was used, minimizing the cross-entropy loss function. The hyperparameters of the optimizer such as the batch size and the learning rate were explored in order to determine a configuration for this problem. The models were trained for 100 epochs, after which they achieved stable performance. The initialization of the networks was done in two different ways: random initialization, using the standard initialization, and pre-trained weights on ImageNet as starting point. In one implementation, to validate the model the separation between training and validation data set was done attending to the objects. This means that all the images correspondent to one object are present in either the training or validation set but not in both at the same time, which gives more validity to the performance observed in the validation set. For example, 20% of the objects can be placed in the validation set while the remaining 80% can be used for training.

Generation of Model Inputs to Train the Machine Learning System

FIG. 3 shows examples of training data that can be generated for training models. The data used for training the models can be generated using the video game engine. FIG. 3 provides four different examples of glitches that can be synthesized. Image A is an image without a graphical glitch. The graphical glitches can be grouped into corrupted textures and missing textures. The corrupted textures refer to textures that are still rendered in the object, but due to some error, they are corrupted. The corrupted textures are divided into two sub-categories: stretched and low resolution. Stretched textures (Image B) can be caused due to errors like a wrong texture mapping to the object surface or a deformation in the object. The texture is deformed, and characteristic line patterns show in the rendered image. In image 1B, the glitches were generated by scaling the texture on one random direction. In practice this may not happen in each instance since the shape of the object is not deformed. Low Resolution textures (Image C) can result in a texture that appears as blurry in contrast with other elements of the scene at the same distance from the observer. This can occur when lower resolution texture is loaded with a different level of detail. Missing textures (Images D-F) can result when one or more of the textures from the object are not rendered at all, which can generally be noticed in two ways, a missing texture or a placeholder texture. A missing texture (Image D) occurs when the texture is not rendered due to a malfunction in the object and the graphical engine renders no details like texture or shadows. This results in a space where the object is located that appears as a solid color. When the texture is missing the engine will generally trigger a standard function by replacing the texture with a monochromatic placeholder (such as pink). A placeholder textures occurs when a texture may not available. For example, the texture was not have loaded correctly, the texture was not found in the asset database, or otherwise not available. In these cases, a default placeholder texture can be used. The placeholder textures are not supposed to be used in the final version of the game but sometimes they are not updated to the correct ones resulting in faulty images (see Image E and F).

To generate the glitches as training data, the camera was set viewing an object, and the object had its textures modified so that a glitch shows in the image. In every image at most one object has a glitch. The data can be used to generate samples being balanced between the 5 classes corresponding. The samples may be equally balanced (e.g., 20% of the data to normal samples and 80% to the different kinds of glitches). To capture all the images a set number of virtual objects can be used images can be taken per object in various angles and distances.

Machine Learning Model Generation Process

Figure 4:
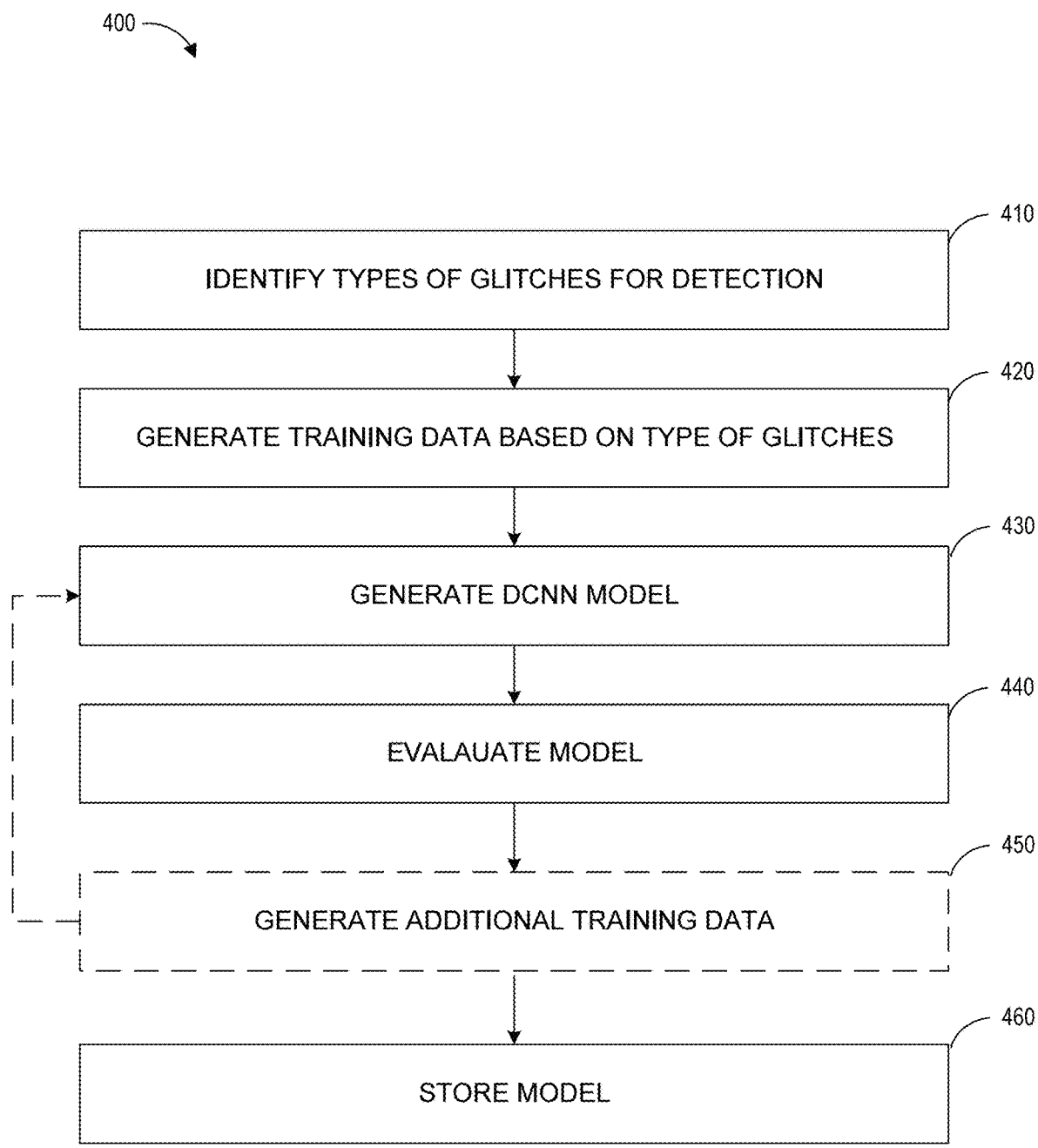
FIG. 4 illustrates a flowchart of an embodiment of a process for generating a machine learning model.

FIG. 4 illustrates an embodiment of a flowchart for a process for generating a glitch detection model. The process 400 can be implemented, in whole or in part, the machine learning system 134, the interactive computing system 120, or other computing system. Although any number of systems, in whole or in part, can implement the process 400, to simplify discussion, the process 400 will be described with respect to the machine learning system 134.

At block 410, the types of graphical glitches that are going to be detected are identified. The developer can define each types of glitch that will be detectable by the model. At block 420, training data for the graphical glitches is generated using the game engine. The graphical glitches can be generated for each type of defined glitch. The graphical data can generate correct images without glitches and images with the identified graphical glitches. The data can be generated by the game engine up to set number of data sets for use in training and validation.

At block 430, the training data can be used to generate the machine learning model. The machine learning system can use a deep convolutional neural network configured to use convolution analysis to analyze the images. The machine learning systems can be used to generate and update the models using supervised and non-supervised machine learning algorithms. Machine learning systems can be implemented using libraries such as ResNet, VGG, Alexnet, and ShuffleNetV2.

At block 440, the machine learning system can evaluate the model to determine whether it is sufficiently stable. The machine learning model can determine any deficiencies in the model. Based on any determined deficiencies, the machine learning model can proceed to generate additional training data at block 450 and then proceed to update the model until the model is sufficiently stable to execute during runtime. At block 460, the model can be stored for later use.

Embodiments of Application of Machine Learning Model

Figure 5:
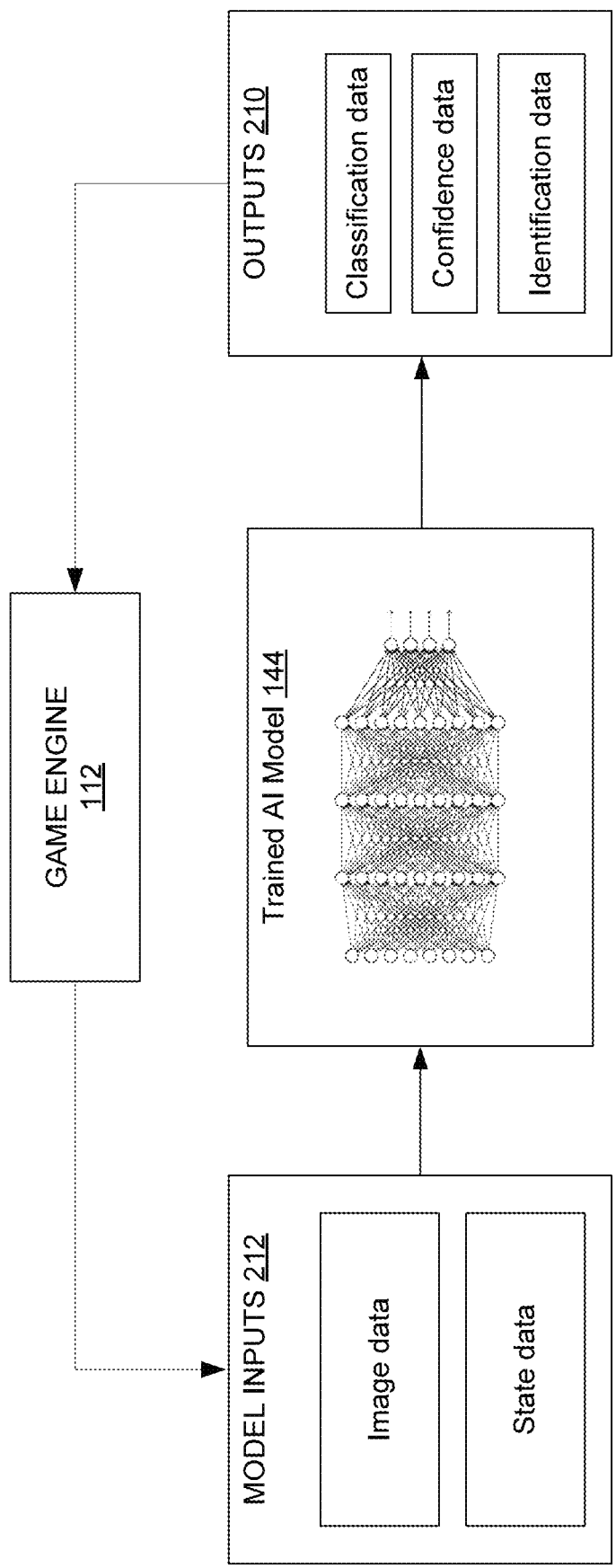
FIG. 5 presents a block diagram illustrating application of a machine learning model.

FIG. 5 shows an example of the trained model 144 used to generate outputs 210. The outputs 210 can be used to identify graphical glitches during runtime of a video game glitch detection session being executed by a video game engine 112.

As the graphical glitch detection session is being executed by the game engine 112, a virtual camera within the game environment can move through the virtual environment of the game application. The model 144 receives as inputs image data and state data from the game engine. The game engine 112 renders a plurality of frames per second. Each frame that is rendered can be input as image data into the model 144. The model inputs include state data associated with the virtual environment, such as spatial or positional information of camera and virtual objects in the video game environment.

The model can analyze the image data included in each frame. Each frame can include a plurality of virtual objects. The model can classify each virtual objects within the frame. The classification of each virtual object can be based on a plurality of images acquired for the object at different angles. For example, the classification of an object may be performed after a threshold number of images of the object are acquired of the object. The state data can be used to identify the objects within the frames.

Based on the analysis, the model can generate outputs 210, which can include classification data, confidence data, and identification data. The classification data can provide a classification of the virtual object into one of the defined classes of the model. The classifications can include a correct image classification or a plurality of error classifications representative of different types of graphical glitches.

The output can include confidence data associated with the classification of the virtual object. The confidence data can be a value that is indicative of how confident the model is that the classification is correct. The confidence data can help to reduce the number of false positives generated by the model. The confidence data value can be compared to a confidence threshold. If the confidence data value does not satisfy the confidence threshold, the model can indicate that additional image and/or state data is needed to better classify the virtual object. The game engine 112 can then manipulate the camera within the game environment to acquire additional image data of the identified virtual object.

The additional image data can be acquired by modifying the rendering parameters of the virtual environment. For example, the lighting settings can be adjusted. By default, the lighting and rendering settings can be set to the default for the game mode that is being tested in the virtual environment. However, the game engine can dynamically adjust the lighting and other rendering parameters in order to provide more robust image data that can be used during the analysis of the virtual object. The confidence analysis can be done in stages, for example, the first stage can be to collect additional images associated with the asset and then analyze and determine whether the threshold has been satisfied. If the confidence threshold has not been satisfied, then the game engine can adjust the rendering characteristics in order to collect additional data for the virtual object. The modification of the rendering parameters may be done in stages as well.

The identification data can include data used for identification of virtual object that includes the error. For example, the identification data can include at least one frame that includes a virtual object with an error, the name of the virtual object that includes the error, a timestamp of the time during the capture session, spatial coordinates within the game environment of the location of the virtual object, or a location of the virtual object within the identified frame.

The outputs 210 can be provided to the data aggregation system to generate an aggregated analysis of the glitch detection session.

Embodiments of Camera Movement Paths

Figure 6A:
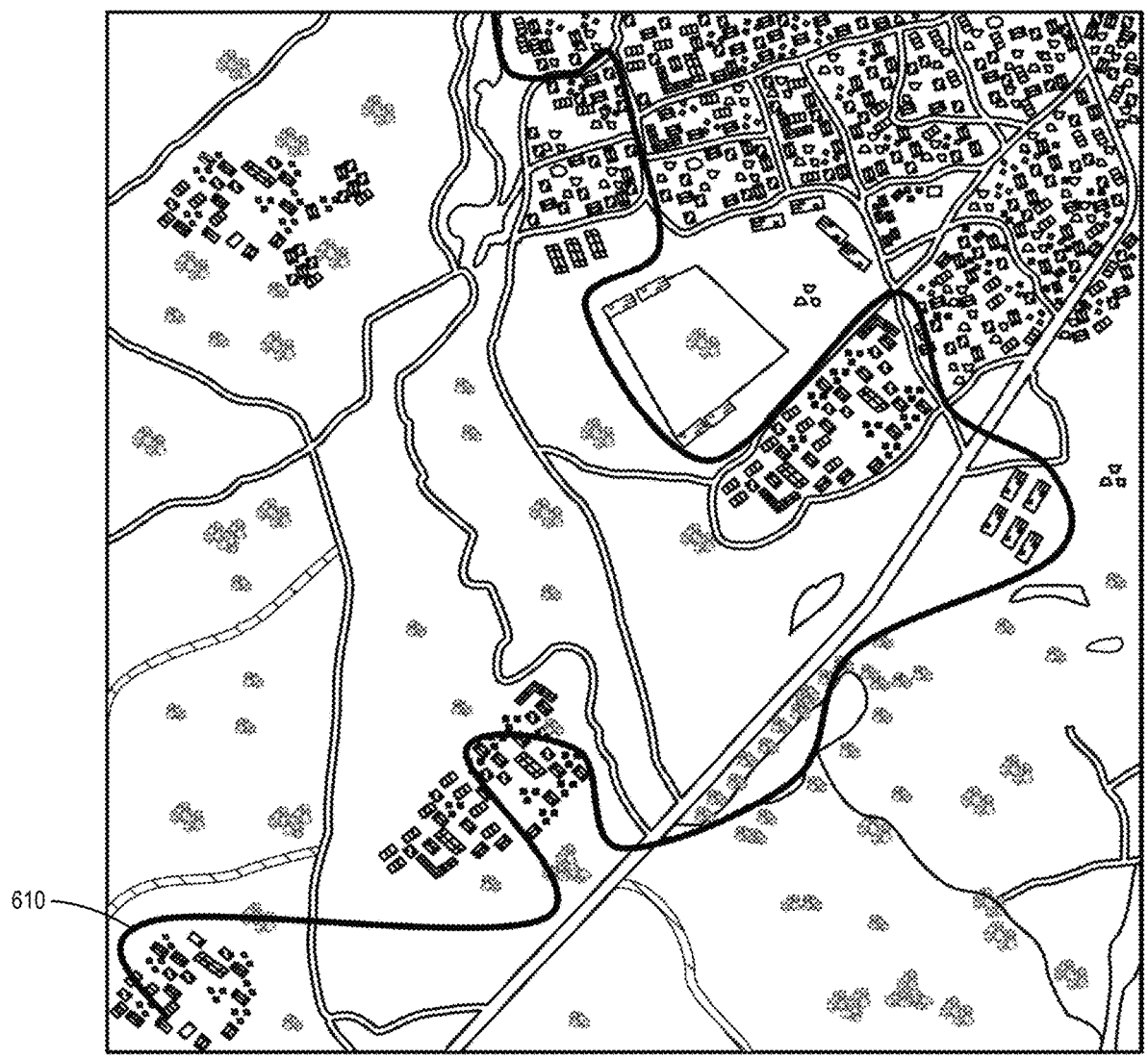
FIGS. 6A, 6B, 6C, and 6D provide embodiments of various types of camera paths.
Figure 6B:
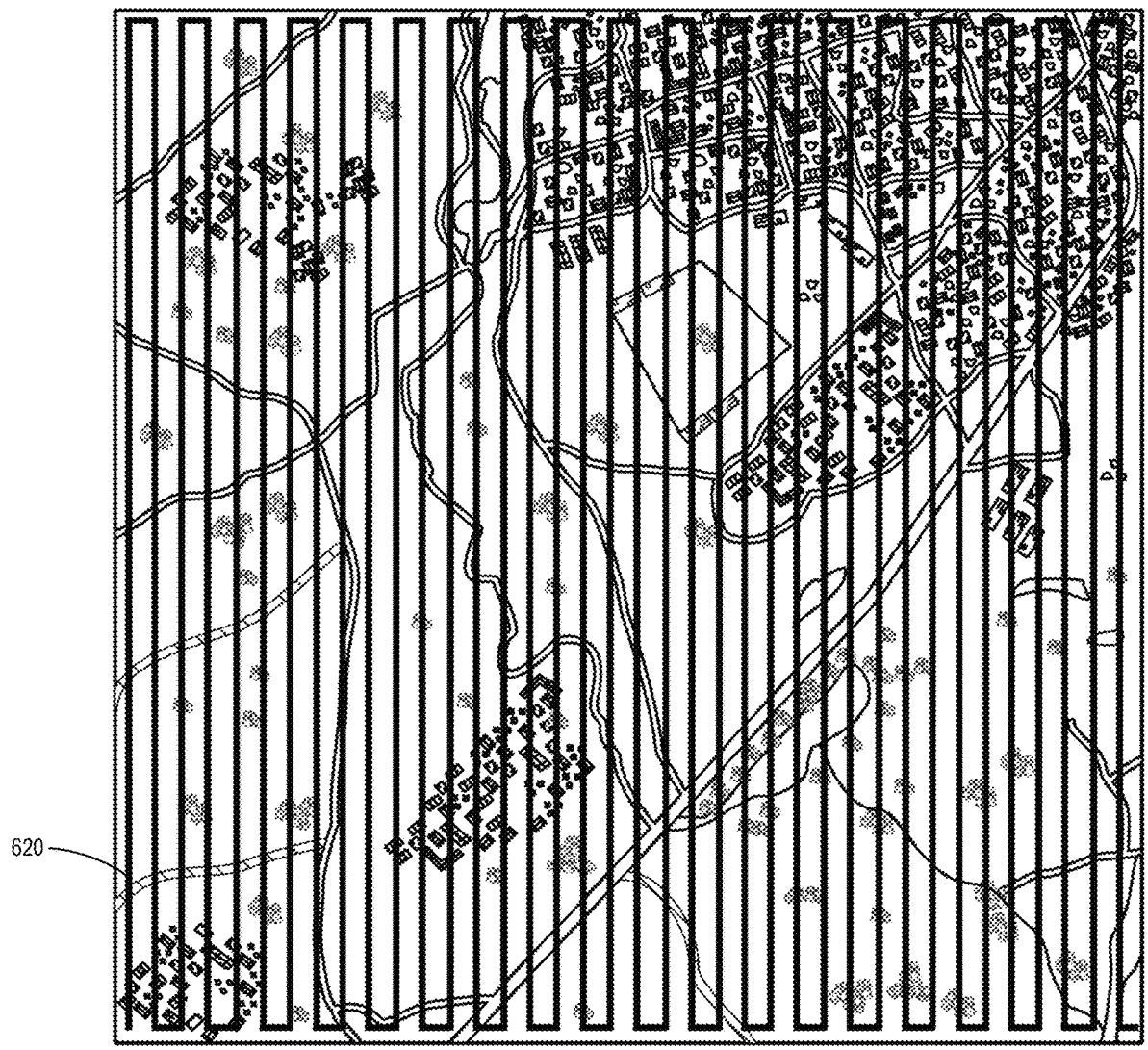

FIGS. 6A-6D illustrated embodiments of a movement path of a virtual camera through a virtual environment during a glitch detection session, which is generally referred to as a camera path. The embodiment in FIG. 6A illustrates a basic camera path 610 that does not comprehensively evaluate the virtual environment. The camera path 610 follows a defined path through the virtual environment. The camera path 610 may be created based on a determination of areas where a virtual character is most likely to travel. The path may cover a portion of the of the game environment. The camera path 610 may be defined by a developer or based on an evaluation of movements of virtual characters based on telemetric data associated with the game. For example, the camera path 610 can be generated to analyze the path most likely to be traveled by a virtual character following the primary path through the virtual environment to arrive at a destination. With additional reference to FIG. 6B more comprehensive coverage of the virtual environment is illustrated by camera path 620. The camera path can be configured to analyze a percentage of virtual objects within the environment. The camera path can be configured based on the size of virtual objects within the game. For example, smaller assets may have a lower importance because they are more difficult to analyze (e.g., generate greater false positives) and have a lower chance of generating a significantly disruptive graphical glitch within the virtual environment.

Additionally, the types of camera path generated may be based on the type of release or update to the game application. For smaller updates, a less expensive and time consuming, such as camera path 610, may be implemented, whereas for a more extensive update or prior to release of a video game a more robust analysis of the environment can be performed, such as camera path 620. The camera path 620 can provide a more comprehensive analysis of assets within the game environment.

Figure 6C:
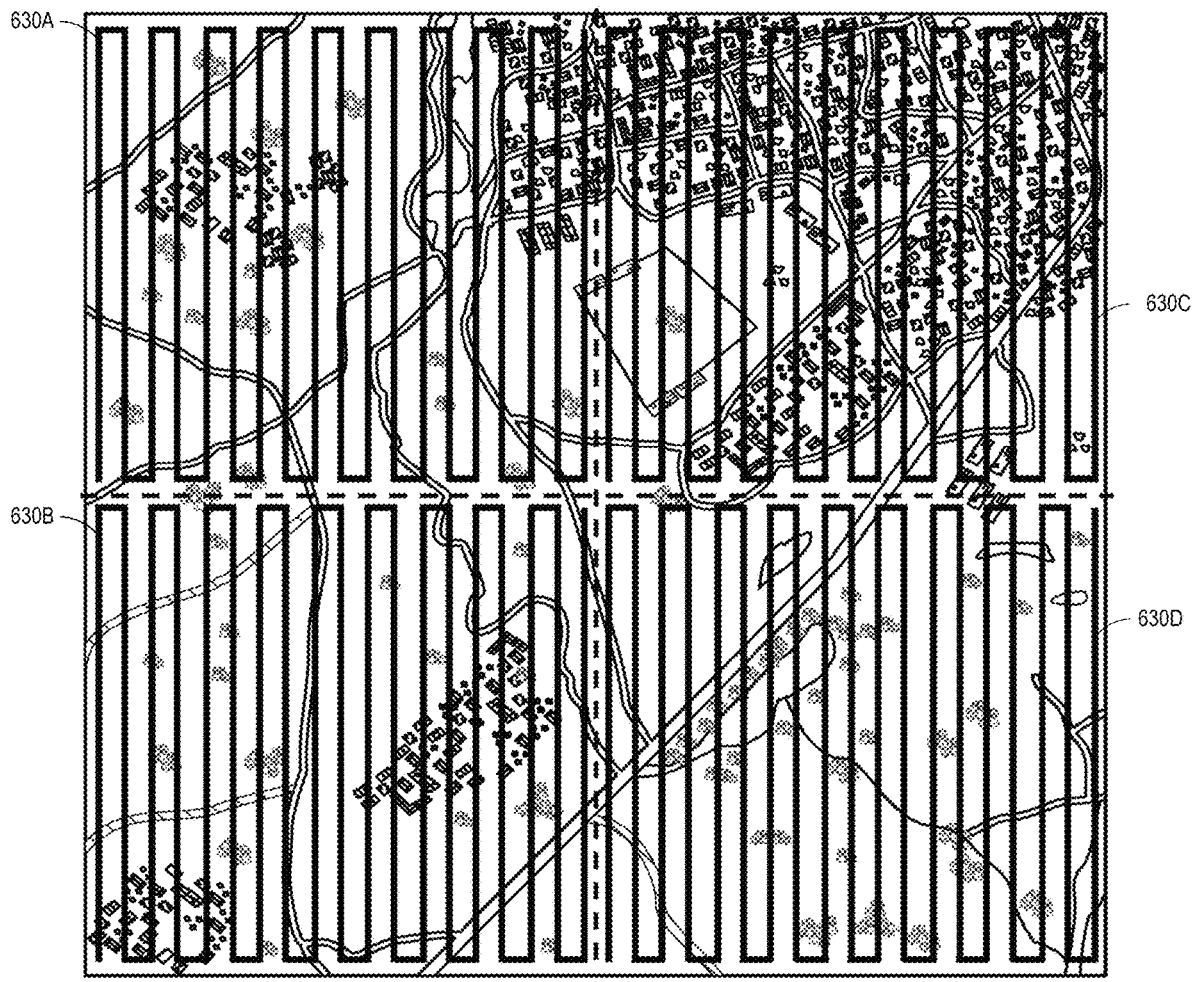

FIG. 6C illustrates an embodiment where the virtual environment is divided into multiple camera paths 630A-D that can be performed in parallel by multiple computing system. The automation system 136 can be configured to execute a process where a plurality of client computing devices evaluate the same virtual environment. The individual camera paths do not have to be performed simultaneously within the same instance of the game application. Rather, each client system can be executing its own instance of the game application using the same version of the game application. This type of division of resources can provide for parallel processing of the virtual environment and can be used to effectively reduce the amount of time spent on analyzing the updated virtual environments.

Figure 6D:
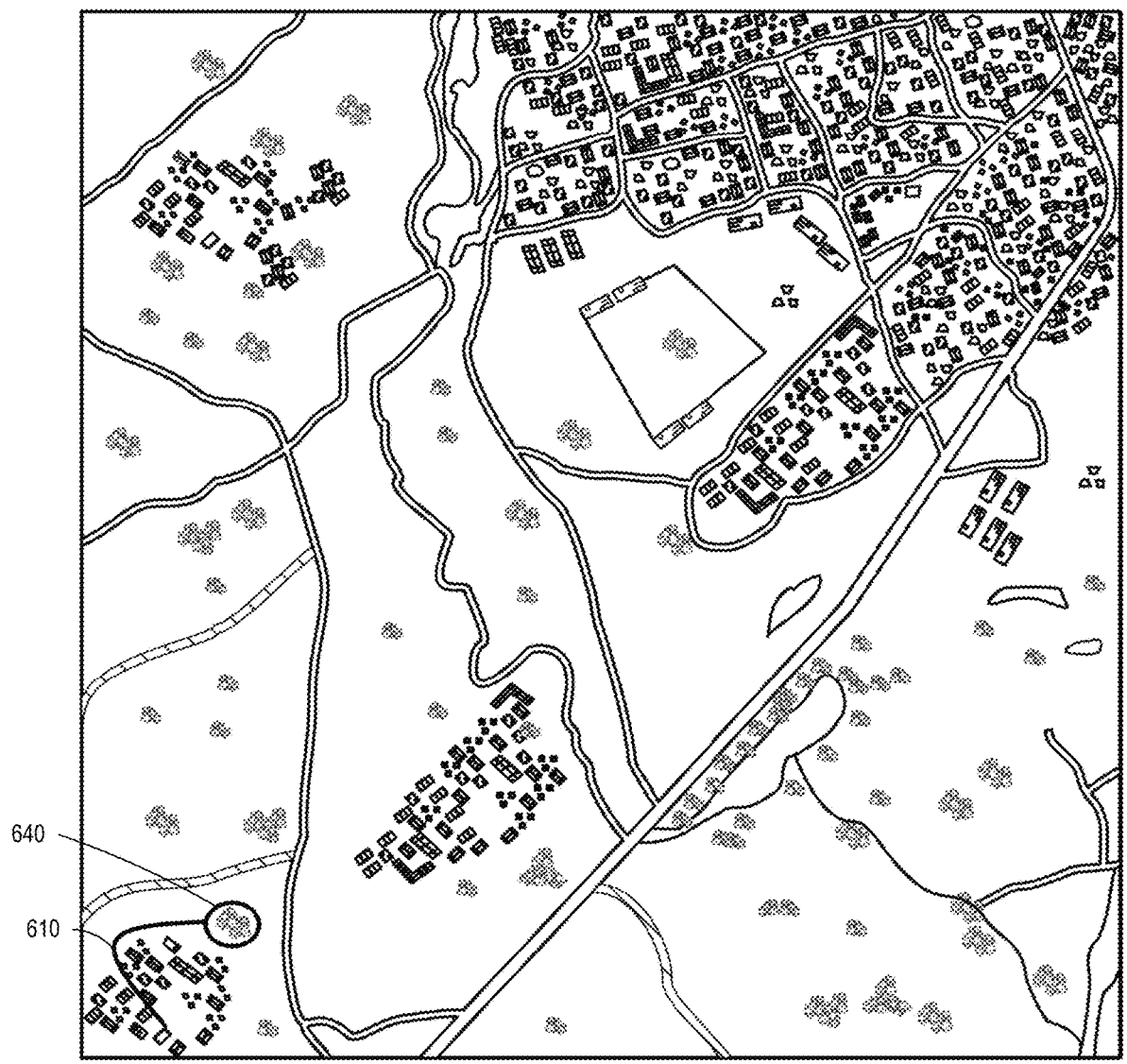

FIG. 6D illustrates an embodiment of a confidence camera path 640. A confidence camera path is executed during analysis of image data when the classification of a virtual object does not satisfy a confidence threshold. For each asset, the confidence value is used to reduce the number of false positives when detecting errors. If the confidence value is below a threshold, then the system can determine that additional image data associated with the asset needs to be acquired. The confidence camera path deviates from the original camera path in order to acquire the additional image data associated with the virtual object. After the confidence camera path has been completed, the camera can return to the original path. In some embodiments, if the confidence path generates image data from other portions of the original camera path, such portions of the camera path may be bypassed.

Embodiment of Glitch Detection Process

Figure 7:
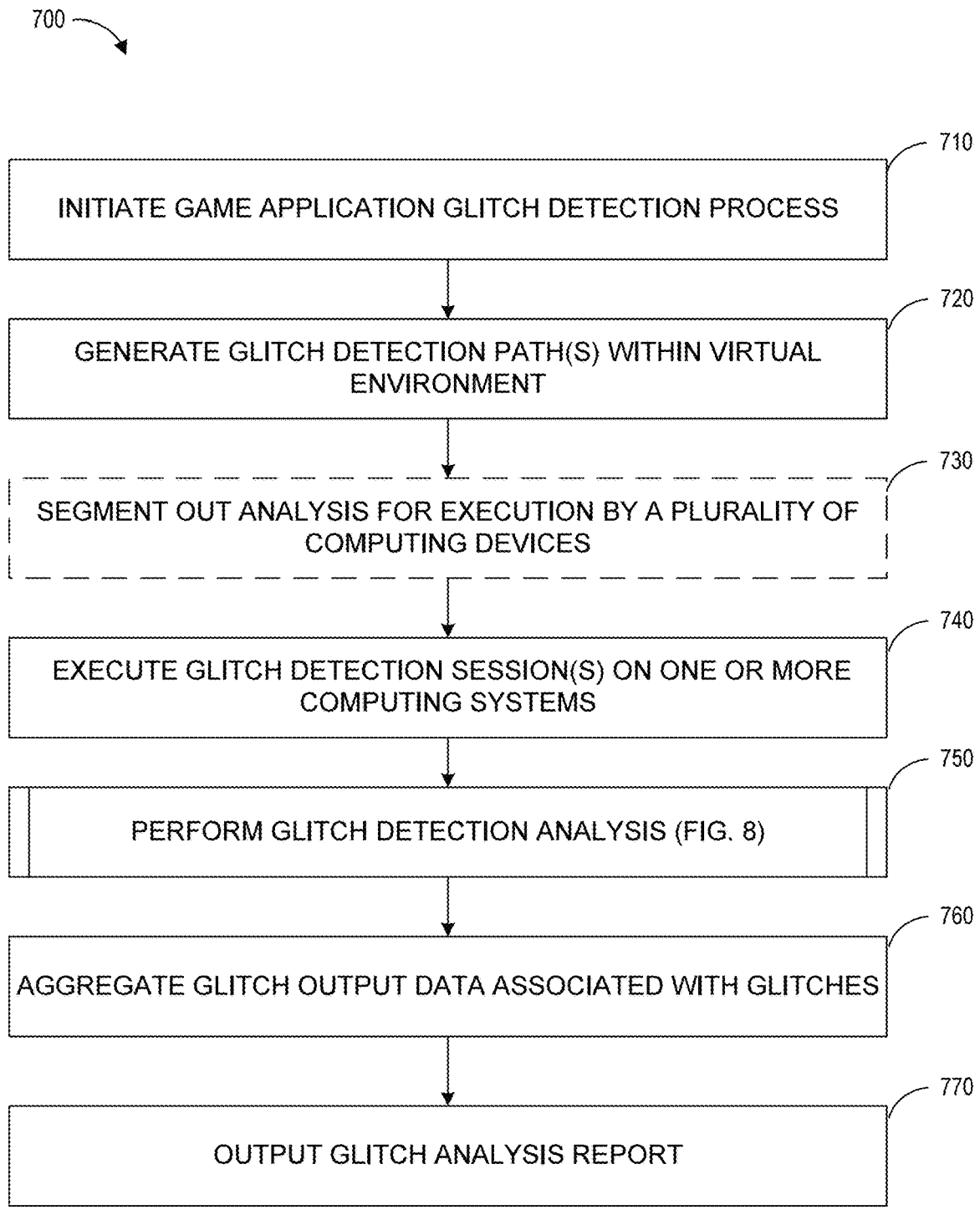
FIG. 7 illustrates a flowchart of an embodiment of a glitch detection process.

FIG. 7 illustrates an embodiment of a flowchart for a process for glitch detection of a game application. The process 700 can be implemented by any computing system that can execute a test setup for a game application. For example, the process 700, in whole or in part, can be implemented by a game application test system 130, a client computing system 102, the interactive computing system 120, or other computing systems. Although any number of systems, in whole or in part, can implement the process 700, to simplify discussion, the process 700 will be described with respect to the game application test system 130.

At block 710, a game application glitch detection process is initiated. The process can be initiated based on a release of a build or update to a game application. The glitch detection process is configured to capture the game environment for the game application and identify graphical glitches in the rendered virtual environment of the game application. The process can be initiated by the developers and can identify the portions of the environment that need to be evaluated. Additionally, the testing parameters can be determined. The game testing parameters may include amount of time of the test, type of test, machine learning models used for the test, confidence thresholds, rendering parameters, and other aspects of the virtual environment that are to be evaluated. Additionally, a plurality of different graphical settings of the same environments may be tested in parallel. The types of models that are to be used for testing can be selected. The game environment can have a plurality of different models that are being used to perform the analysis of the virtual environment. These models can be based on the specific environment or biomes that are being analyzed.

At block 720, glitch detection camera path(s) can be generated for the virtual environment. The camera paths can be generated based on the virtual environment that is being analyzed. For virtual environments where multiple models are to be used in the evaluation, different paths can be generated for each model that is being used in the evaluation. In some embodiments, multiple models can be used in a single path. The game testing system can determine a path for the camera. The game testing system can use test parameters that can be used to define the camera path during the test procedure. In some embodiments, the camera path can be defined by a specific path created by a user, such as a developer. For example, the developer may use a spline to define a path within the environment that the camera follows. In some embodiments, the camera path can be defined by programmatic parameters. For example, the path can be programmatically defined to cover a certain portion (such as a percentage) of the virtual environment. The path can be generated based on the virtual objects within the environment. For example, the path may be generated based on objects that are considered key elements within the environment or based on the size of the virtual object within the environment.

At block 730, optionally, the execution of the analysis can be divided into a plurality of segments for execution by a plurality of client computing devices. The different segments of the virtual environment can be divided based on determined camera paths so that the testing can be done in parallel by a plurality of client computing systems. In some instances, the clients can be different virtual machines, such that a plurality of instances can be executed by a single client computing system.

At block 740, the game testing system can execute the testing process on one or more computing systems. The game application can be executed in a specific test mode that is used by the game engine for analyzing the virtual environment during runtime. In some embodiments, the glitch detection system may be configured to run the game in a default gameplay mode when it is called for by the test procedure. The test mode can provide universal control of the camera within the game application. The camera can move around within the game environment and the game engine can render the environment as if a user is playing the game. The game testing system can record the image data displayed within the view of the virtual camera. The game may be rendering frames at 30 fps, 60 fps or any defined fps in accordance with the testing parameters. The test mode can be configured to allow the camera have unrestricted movement through the 3D space of the virtual environment. For example, the camera can have a range of movement that would not be provided to the user during a default gameplay mode. Rather the camera can move, rotate, and be oriented to view any part of the virtual environment. Additionally, the game testing system can interface with the game engine to control aspects of rendering within the environment.

At block 750, the game testing system can perform the glitch detection analysis within the game environment of the game application to identify glitches. The subprocess for analyzing virtual objects within the game environment is described with respect to FIG. 8. The output of the glitch detection analysis process can be analyzed and aggregated at block 760.

At block 760, the game testing system receives the analysis output from the glitch detection process. The output data can include classification data, confidence data, and location data. The data may also include raw video data acquired during the analysis session, telemetry data, timestamps and an identification of frame(s) associated with specific assets, the output may additionally include locational data for an asset (such as coordinates identifying the location of the asset within the virtual environment). The identification of each frame can additionally include segmentation of the image so that the portion of a frame can be identified for the reviewer so that the image of the asset is visible and/or an identification of the specific asset. The game testing system can compile and aggregate data generated by one or more clients running the glitch detection system for the game environment. The data can be correlated to the areas within the game environment for which each of the clients generating output data.

At 770, the data can be output for generation of a glitch analysis report. The data can be used by the data aggregation system to generate a report that can be analyzed by a developer to determine what to do with identified glitches within the virtual environment.

The report can be generated that identifies each of the qualitative glitches within the virtual environment. The qualitative data can identify the frame where the glitch occurs. The frame may be linked to the report such that the developer can click on a link associated with the glitch and a video associated with the glitch can be shown which can be queued to the time stamp associated with the glitch. Additionally, the glitch report can identify a segment of frame in which the glitch appears. In addition to or alternatively, the glitch report can identify the asset that is associated with the glitch and a location of the object within the coordinate system of the game. In some embodiments, the report may be integrated into the interface with the game engine such that a user can select the asset and the game application can load the asset within the game environment.

The report can provide a quantitative analysis of the data. The quantitative analysis can provide the developer with the type and number of errors that have been generated by the update. This can provide the developers with an understanding of potential problems. For example, the report could identify that a certain portion of the environment is experiencing a significant number of errors relative to the other portions of the environment The developers can confirm that each of the errors are in fact errors and can identify false positives within the report. The false positive information can be provided as part of a feedback loop to the machine learning system in order to determine whether aspects of the model need to be updated.

Embodiment of Glitch Detection Analysis Process

Figure 8:
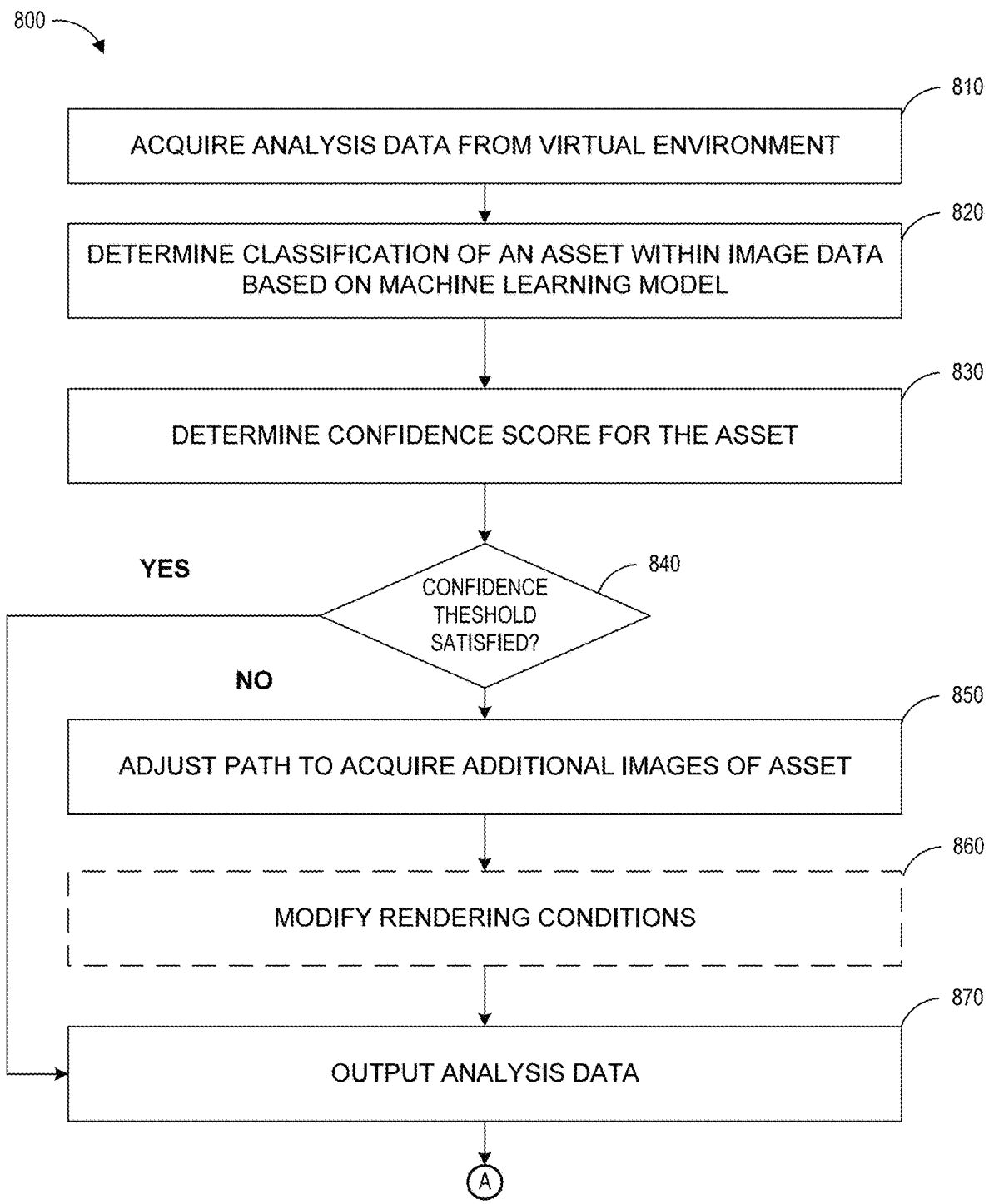
FIG. 8 illustrates a flowchart of an embodiment of a process of glitch detection analysis.

FIG. 8 illustrates an embodiment of a flowchart for a process for glitch detection analysis within the virtual environment of a game application. The process 800 can be implemented by any computing system that can execute a test setup for a game application. For example, the process 800, in whole or in part, can be implemented by a game application test system 130, glitch detection system 132, a client computing system 102, the interactive computing system 120, or other computing systems. Although any number of systems, in whole or in part, can implement the process 800, to simplify discussion, the process 800 will be described with respect to the glitch detection system 132.

At block 810, the glitch detection system acquires analysis data from the virtual environment. The analysis data can include image data and state data from the virtual environment. The image data can be acquired from frames captured and rendered during movement of a virtual camera through the virtual environment along the camera path. The acquired frames are analyzed during runtime of the glitch analysis session. The glitch detection system can acquire multiple frames per second. The frames may be acquired at a rate at which the glitch detection system can process the frames to determine whether glitches exist. The rate at which frames are acquired may be limited by the rate at which the frames can be rendered by the game engine.

At block 820, the acquired frames are analyzed by the machine learning model to determine a classification for virtual objects within the virtual environment. The model can analyze the frames to identify the virtual objects. The model may use telemetry data associated with the frame and provided by the game engine to identify the virtual objects. The machine learning model can identify different frames that include the same virtual object. The image data associated with the same virtual object can be used to determine the classification of the virtual object. The machine learning model may have a threshold number of images of an object that is used to determine whether the object can be classified. For example, the glitch detection system model may classify the virtual object after a threshold number of images of the specific asset has been analyzed. The classifications are determined based on the classification defined during generation of the machine learning model. The classifications can include a normal graphical texture class and one or more graphical texture error classes. For example, the graphical texture error classes may include a corrupted texture or a missing texture. The classification can be any number of classifications.

At block 830, the machine learning model can determine a confidence score for the virtual object. In some embodiments, the glitch detection system does not determine a confidence score. In such embodiments, the process proceeds directly to block 870. The confidence score can be generated for an asset. The confidence score indicates a level of confidence that the asset has been correctly classified.

At decision block 840, the confidence score can be compared to a confidence threshold to determine whether the confidence score satisfies the threshold. If the confidence score satisfies the threshold. Then the classification associated with a virtual object is maintained and the process proceeds to block 870. If the confidence score does not satisfy the threshold, the glitch detection system can perform additional actions within the game application to increase the confidence score associated with the asset.

At block 850, the glitch detection system can adjust the camera path to acquire additional images of the asset within the environment. The camera path may be adjusted to capture the asset from additional angles. The glitch detection system may use parameters associated with the virtual object, such as the geometry of the asset and the type of the asset, to determine adjustments to the camera path. After analyzing the additional image data, the glitch detection system can determine a classification and a new confidence score associated with the asset. If the score satisfies the threshold the classification is accepted and the process proceeds to block 870.

At block 860, optionally, the glitch detection system can modify rendering characteristics of the virtual environment in order to improve the confidence score associated with the asset. The lighting conditions of the virtual environment may make it difficult to classify the asset. For example, if the environment includes a dark cave, it may be difficult to evaluate the asset without additional lighting. The glitch detection system can adjust the parameters and acquire additional image data. The rendering parameters can then then be adjusted back to the default rendering parameters. After analyzing the additional image data, the glitch detection system can determine a classification and a new confidence score associated with the asset. If the score satisfies the threshold the classification is accepted and the process proceeds to block 870. In some embodiments, the process may be repeated multiple times At block 870, the glitch detection system can output the analysis data. The analysis data may be compiled for the entire glitch analysis session prior to being output by the glitch detection system. For individual glitches, the analysis data can include classification data, confidence data, and location data associated with the virtual objects.

The analysis process can be completed for each asset identified within the image data acquired during traversal along the camera path. The process proceeds to A, which proceeds to block 760 in FIG. 7.

Overview of Computing Device

Figure 9:
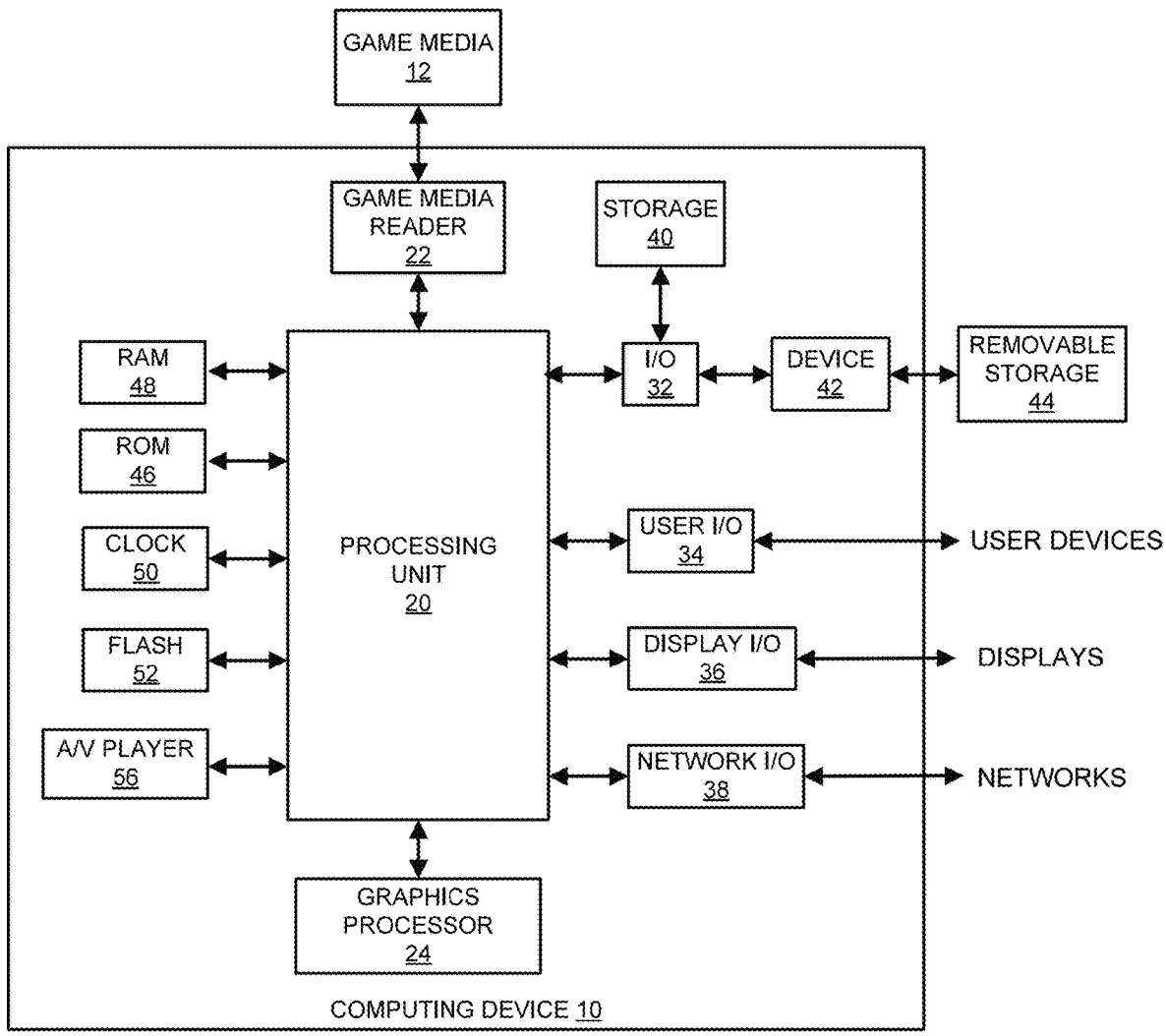
FIG. 9 illustrates an embodiment of a computing device.

FIG. 9 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   executing a game application in a test mode;
   receiving a path for a virtual camera within a virtual environment, the path having a start point and an end point, wherein the virtual environment is rendered within the test mode by a game engine, wherein the virtual camera follows the path from the start point to the end point within the virtual environment;
   during runtime of the test mode, acquiring frames rendered by the game engine, wherein the frames are rendered based on a viewpoint of the virtual camera within the virtual environment, wherein the virtual environment includes a plurality of virtual objects;
   analyzing the frames using a machine learning model, wherein the analysis by the machine learning model comprises:
   for individual virtual objects of the plurality of virtual objects,
   identifying a virtual object in a plurality of frames generated from a plurality of viewpoints along the path, wherein the plurality of frames capture the virtual object from a plurality of different viewpoints;
   analyzing a rendered appearance of the virtual object from the plurality of different viewpoints captured within the plurality of frames;
   determining a classification of the virtual object based on the analysis, wherein the classification is one of a plurality of classifications of graphical glitches, wherein each classification corresponds to different types of graphical errors of the rendered appearance of virtual objects within the virtual environment;
   determining a confidence score associated with the classification of the virtual object based on the analysis;
   determining whether the confidence score satisfies a confidence threshold associated with the classification;
   in response to a determination that the confidence score associated with the classification of the virtual object satisfies the confidence threshold, outputting the classification of the virtual object; and
   in response to a determination that the confidence score does not satisfy the confidence threshold, adjusting the path to create an intermediate path prior to the end point, and moving the virtual camera along the intermediate path to acquire frames from additional viewpoints of the virtual object.

2. The method of claim 1, wherein if the confidence score does not satisfy the confidence threshold, the method further comprises, determining a classification based on an analysis including the additional frames.

3. The method of claim 1, wherein if the confidence score does not satisfy the confidence threshold, the method further comprises adjusting rendering parameters of the virtual environment and acquiring additional frames including the virtual object, and determining a classification based on an analysis including the additional frames.

4. The method of claim 3, wherein adjusting the rendering parameters includes changing lighting conditions of the virtual environment.

5. The method of claim 1, wherein the path through the virtual environment is programmatically defined.

6. The method of claim 1, wherein the virtual environment is a three dimensional virtual environment.

7. The method of claim 1, wherein the classifications of graphical glitches include corrupted textures, stretched textures, low resolution textures, missing textures, and place holder textures.

8. The method of claim 1 further comprising generating a bug report based on the identified graphical glitches in the virtual environment.

9. The method of claim 8 further comprising identifying a frame including the virtual object classified as a graphical glitch and a timestamp of the frame.

10. The method of claim 9 further comprising identifying a portion of the frame including the virtual object.

11. A system comprising:
a data store storing a machine learning model; and
at least one hardware processor configured with computer executable instructions that configure the at least one hardware processor to:
execute a game application in a test mode;
receive a path for a virtual camera within a virtual environment, the path having a start point and an end point, wherein the virtual environment is rendered within the test mode by a game engine, wherein the virtual camera follows the path from the start point to the end point within the virtual environment, wherein the virtual environment includes a plurality of virtual objects;
acquire frames rendered by the game engine, wherein the frames are rendered based on a viewpoint of the virtual camera within the virtual environment;
analyze the frames using a machine learning model, wherein the analysis by the machine learning model comprises:
for individual virtual objects of the plurality of virtual objects,
identify a virtual object in a plurality of frames generated from a plurality of viewpoints along the path, wherein the plurality of frames capture the virtual object from a plurality of different viewpoints;
analyze a rendered appearance of the virtual object from the plurality of different viewpoints captured within the plurality of frames;
determine a classification of the virtual object based on the analysis, wherein the classification is one of a plurality of classifications of graphical glitches, wherein each classification corresponds to different types of graphical errors of the rendered appearance of virtual objects within the virtual environment;
determine a confidence score associated with the classification of the virtual object based on the analysis;
determine whether the confidence score satisfies a confidence threshold associated with the classification;
in response to a determination that the confidence score associated with the classification of the virtual object satisfies a confidence threshold, output the classification of the virtual object; and
in response to a determination that the confidence score does not satisfy the confidence threshold, adjust the path to create an intermediate path prior to the end point, and move the virtual camera along the intermediate path to acquire frames from additional viewpoints of the virtual object.

12. The system of claim 9, wherein if the confidence score does not satisfy the confidence threshold, the computer executable instructions further configure the at least one hardware processor to determine a classification based on an analysis including the additional frames.

13. The system of claim 11, wherein if the confidence score does not satisfy the confidence threshold, the computer executable instructions further configure the at least one hardware processor to adjust the path of the virtual camera to adjust rendering parameters of the virtual environment to acquire additional frames including the virtual object, and determine a classification based on an analysis including the additional frames.

14. The system of claim 13, wherein the adjustment of the rendering parameters includes changing lighting conditions of the virtual environment.

15. The system of claim 11, wherein the classifications of graphical glitches include corrupted textures, stretched textures, low resolution textures, missing textures, and place holder textures.

16. The system of claim 11, wherein the computer executable instructions further configure the at least one hardware processor to:
generate a bug report based on the identified graphical glitches in the virtual environment;
identify a frame including the virtual object classified as a graphical glitch and a timestamp of the frame; and
identify a portion of the frame including the virtual object.

* * * * *